Nov. 18, 1924.

M. B. ARMITAGE 1,516,321

CHILD'S VEHICLE

Filed Sept. 8, 1922

M. B. Armitage, Inventor

By C. A. Snow & Co., Attorney

Patented Nov. 18, 1924.

1,516,321

UNITED STATES PATENT OFFICE.

MARJORIE B. ARMITAGE, OF COLORADO SPRINGS, COLORADO.

CHILD'S VEHICLE.

Application filed September 8, 1922. Serial No. 586,941.

*To all whom it may concern:*

Be it known that I, MARJORIE B. ARMITAGE, a citizen of the United States, residing at Colorado Springs, in the county of El Paso and State of Colorado, have invented a new and useful Child's Vehicle, of which the following is a specification.

This invention relates to toys and more particularly to toy vehicles.

The object of the invention is to provide a vehicle, the seat or body of which is constructed in the form of a bird or animal in the manner of a saddle.

Another object is to provide a toy of this character which may be attached to form the seat of a child's vehicle, velocipede, hobby horse or the like.

With the foregoing and other objects in view which will appear as the description proceeds, the invention resides in the combination and arrangement of parts and in details of construction hereinafter described and claimed, it being understood that changes in the precise embodiment of the invention herein disclosed may be made within the scope of what is claimed without departing from the spirit of the invention.

In the accompanying drawings:—

Figure 1:
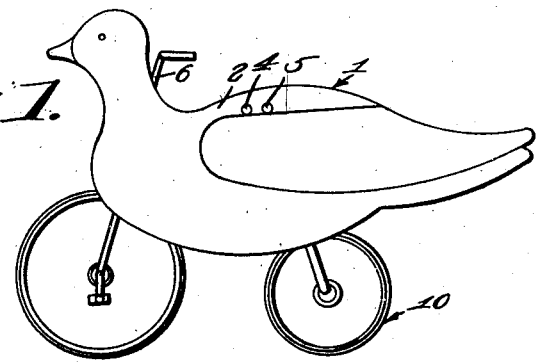
Figure 1 represents a side elevation of a toy constructed in accordance with this invention.
Figure 2:
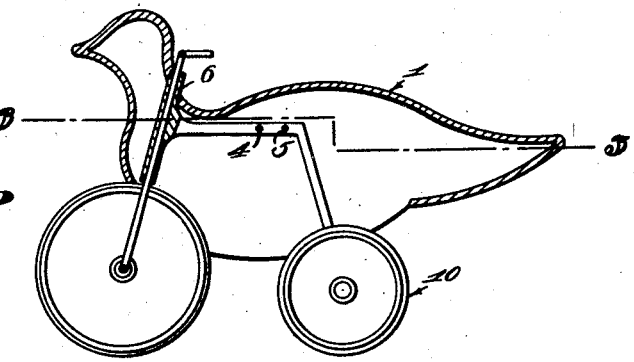
Fig. 2 is a central vertical section thereof.
Figure 3:
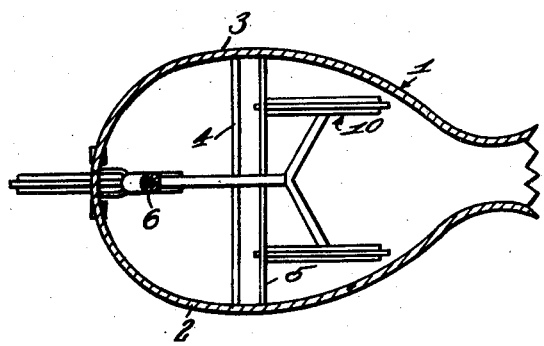
Fig. 3 is a horizontal section taken on the line 3—3 of Fig. 2.

In the embodiment illustrated, the seat 1 constituting this invention is shown in the form of a bird molded from heavy tin or other suitable material and painted to render it attractive. This bird-like seat has the side members 2 and 3 thereof united along the ridge of the back and head, being open at the bottom with the sides flared to form a saddle-like seat which is placed over the velocipede or other vehicle to which it is to be attached and secured by bolting in any suitable manner. As here shown, two attaching rods 4 and 5 extend transversely through the body of the bird and through the frame of the velocipede while the steering post 6 extends up through the bird body preferably adjacent the junction of the head with the neck as is shown clearly in Fig. 2.

While the seat constituting this invention is here shown in the form of a bird, it is of course to be understood that it may be made in the form of any animal or the like. A velocipede 10 is here shown with the seat constituting the invention applied but any other vehicle may be used or it may be used on a hobby horse or toy of similar character.

I claim:—

A toy of the class described comprising a child's velocipede of ordinary construction equipped with a seat in the form of a hollow metal bird or the like opened at the bottom and straddling the frame and upper portions of the wheels with the sides of said bird flared to form a saddle-like structure adapted to be secured to the frame of the velocipede, the body of the bird having an opening adjacent the head for the passage of the steering post of the velocipede, and a plurality of attaching rods extending transversely through the body of the bird and through the frame of the velocipede, said rods extending in a plane substantially at right angles to the steering post whereby the bird is secured to the velocipede securely and with a minimum number of attaching elements.

In testimony that I claim the foregoing as my own, I have hereto affixed my signature in the presence of two witnesses.

MRS. MARJORIE B. ARMITAGE.

Witnesses:
BERT N. TAYLOR,
J. A. LOWDERMAN.